United States Patent
Kubotera et al.

(10) Patent No.: US 9,315,147 B2
(45) Date of Patent: Apr. 19, 2016

(54) BRAKE LIGHT CONTROL DEVICE

(71) Applicant: NISSAN MOTOR CO., LTD., Yokohama-shi, Kanagawa (JP)

(72) Inventors: Katsuaki Kubotera, Hadano (JP); Kotaro Chiba, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 45 days.

(21) Appl. No.: 14/351,931

(22) PCT Filed: Oct. 12, 2012

(86) PCT No.: PCT/JP2012/076528
§ 371 (c)(1),
(2) Date: Apr. 15, 2014

(87) PCT Pub. No.: WO2013/058198
PCT Pub. Date: Apr. 25, 2013

(65) Prior Publication Data
US 2014/0288783 A1    Sep. 25, 2014

(30) Foreign Application Priority Data
Oct. 17, 2011   (JP) ................................. 2011-227764

(51) Int. Cl.
| | | |
|---|---|---|
| *B60R 22/00* | (2006.01) | |
| *E05F 15/00* | (2015.01) | |
| *G05D 1/00* | (2006.01) | |
| *B60Q 1/44* | (2006.01) | |
| *B60T 17/22* | (2006.01) | |
| *B60T 17/00* | (2006.01) | |
| *B60Q 11/00* | (2006.01) | |

(52) U.S. Cl.
CPC ................ *B60Q 1/448* (2013.01); *B60Q 1/444* (2013.01); *B60Q 11/00* (2013.01); *B60T 17/00* (2013.01); *B60T 17/22* (2013.01)

(58) Field of Classification Search
CPC ........... B60Q 1/448; B60Q 1/46; B60T 17/22
USPC ............................................. 701/45; 340/479
See application file for complete search history.

(56) References Cited

U.S. PATENT DOCUMENTS

2009/0040073 A1 *   2/2009   Bootes .......................... 340/984

FOREIGN PATENT DOCUMENTS

| JP | 09-123829 A | 5/1997 |
|---|---|---|
| JP | 2010-264824 A | 11/2010 |
| JP | 2010264824 A * | 11/2010 |
| JP | 2011-157053 A | 8/2011 |

* cited by examiner

*Primary Examiner* — Tuan C. To
*Assistant Examiner* — Isaac Smith
(74) *Attorney, Agent, or Firm* — Foley & Lardner LLP

(57) ABSTRACT

A brake light control device that generates a braking force, and is used with a brake device which can control the braking force according to a signal from a brake control unit regardless of the operation of a brake operator includes: a brake light switch that is inserted and arranged into an electrical connection path between a power supply and a brake light, and is opened and closed together with the operation of the brake operator; and a switching switch that is opened and closed in response to braking force control. The brake light control device further includes: a blinking switch that is connected in parallel to the switching switch; and a control unit that, when the brake light is required to be blinked, is configured to keep the switching switch in an OFF state, and blinks the brake light by repeatedly switching on and off the blinking switch.

4 Claims, 11 Drawing Sheets

| CONDITION | | | | | PROCESSING | |
|---|---|---|---|---|---|---|
| ESS DRIVE | SL_RLY DRIVE STATE | ECU RECOGNITION BRAKE STATE | ESS DRIVE INSTRUCTION (ICC-RLY DRIVE INSTRUCTION) | ECU RECOGNITION BNO STATE CONTINUATION TIME | SL1-RLY DEFECTIVE STATE | SL1-RLY OFF ADHERENCE ABNORMAL FLAG |
| 1 (DRIVE) | 1 (DRIVE) | ON | 1 (LAMP TURNED ON) | $\geq x - \alpha1$ $\leq x - \alpha2$ | NORMAL | 0 (NOT ABNORMAL) |
| | | | | $< x - \alpha1$ | CHECK IMPOSSIBLE | PREVIOUS VALUE RETAINED |
| | | | | $\geq y1$ | ON ADHERENCE | 1 (ABNORMAL) |
| | | OFF | 0 (LAMP TURNED OFF) | $\geq x - \beta1$ $\leq x - \beta2$ | NORMAL | 0 |
| | | | | $< x - \beta1$ | CHECK IMPOSSIBLE | PREVIOUS VALUE RETAINED |
| | | | | $\geq y2$ | CHECK IMPOSSIBLE※ | PREVIOUS VALUE RETAINED |
| | | EXCEPT ABOVE | | | CHECK IMPOSSIBLE | PREVIOUS VALUE RETAINED |

※ OFF ADHERENCE ABNORMALITY OF ICC-RLY CAN BE DETERMINED x: ESS DRIVE INSTRUCTION CONTINUATION SETTING TIME
α1: SL1-RLY ON RESPONSE DELAY MAX TIME
α2: SL1-RLY ON RESPONSE DELAY MIN TIME
β1: SL1-RLY OFF RESPONSE DELAY MAX TIME
β2: SL1-RLY OFF RESPONSE DELAY MIN TIME
y1, y2: SL1-RLY DRIVE ABNORMALITY DETERMINATION PERMISSIBLE TIME

FIG.8

| CONDITION | | | | | PROCESSING | |
|---|---|---|---|---|---|---|
| ESS DRIVE | SL_RLY DRIVE STATE | OTHER UNIT RECOGNITION BNO | ESS DRIVE INSTRUCTION (ICC-RLY DRIVE INSTRUCTION) | ECU RECOGNITION BNO STATE CONTINUATION TIME | SL1-RLY DEFECTIVE STATE | SL1-RLY OFF ADHERENCE ABNORMAL FLAG |
| 1 (DRIVE) | 1 (DRIVE) | Hi | 1 (LAMP TURNED ON) | $\geq x\text{-}\alpha 1$ $\leq x\text{-}\alpha 2$ | NORMAL | 0 (NOT ABNORMAL) |
| | | | | $< x\text{-}\alpha 1$ | CHECK IMPOSSIBLE | PREVIOUS VALUE RETAINED |
| | | | | $\geq y1$ | ON ADHERENCE | 1 (ABNORMAL) |
| | | Lo | 0 (LAMP TURNED OFF) | $\geq x\text{-}\beta 1$ $\leq x\text{-}\beta 2$ | NORMAL | 0 |
| | | | | $< x\text{-}\beta 1$ | CHECK IMPOSSIBLE | PREVIOUS VALUE RETAINED |
| | | | | $\geq y2$ | CHECK IMPOSSIBLE※ | PREVIOUS VALUE RETAINED |
| | | EXCEPT ABOVE | | | CHECK IMPOSSIBLE | PREVIOUS VALUE RETAINED |

※OFF ADHERENCE ABNORMALITY OF ICC-RLY CAN BE DETERMINED x: ESS DRIVE INSTRUCTION CONTINUATION SETTING TIME
α1: SL1-RLY ON RESPONSE DELAY MAX TIME
α2: SL1-RLY ON RESPONSE DELAY MIN TIME
β1: SL1-RLY OFF RESPONSE DELAY MAX TIME
β2: SL1-RLY OFF RESPONSE DELAY MIN TIME
y1, y2: SL1-RLY DRIVE ABNORMALITY DETERMINATION PERMISSIBLE TIME

FIG.11

BRAKE LIGHT CONTROL DEVICE

TECHNICAL FIELD

The present invention relates to a brake light control device for controlling the turning on of a brake light so as to produce, for a vehicle behind or the like, a display indicating that a brake device is being operated.

BACKGROUND ART

When a driver performs an operation of pressing down a brake pedal, a brake device operates, through a medium such as a brake fluid, a brake unit such as a disc brake unit to generate a braking force.

During the braking operated by the brake device described above, it is necessary to notify this to the vehicle behind or the like, and in safety standards, it is mandatory to produce a display by turning on the brake light.

Hence, in general, for example, as disclosed in JP2010-264824A, a brake light switch that is closed together with an operation of pressing down a brake pedal when the amount of operation described above becomes equal to or more than a predetermined amount of operation for generating a braking force is inserted and arranged into an electrical connection path between a power supply battery and a brake light.

In the brake light control device described above, during the braking performed by the pressing down of the brake pedal, the brake light switch operated together with this is closed to bring the electrical connection path between the power supply battery and the brake light into a conduction state. In this way, power is supplied to the brake light from the battery, and thus it is possible to notify a vehicle behind or the like of the fact that the braking is being performed by the turning on.

Incidentally, recently, for preceding vehicle following run control (ACC control) by acceleration and deceleration of the vehicle, vehicle dynamic control VDC by a left/right braking force difference, lane departure prevention control LDP and the like, a brake device has often been used that has a brake control device which can individually control a wheel braking force even by the automatic brake of a wheel regardless of the operation of the brake pedal.

In the case of the brake device described above, depending on the configuration of a brake system, a brake fluid pressure for the preceding vehicle following run control ACC, the vehicle dynamic control VDC and the lane departure prevention control LDP may cause a pressing-down stroke of the brake pedal.

In the conventional brake light control device described above, even when the brake fluid pressure for the preceding vehicle following run control ACC, the vehicle dynamic control VDC and the lane departure prevention control LDP causes the pressing-down stroke of the brake pedal, the brake light switch is closed together with this to turn on the brake light with the battery.

However, although the former preceding vehicle following run control ACC is intended to produce a vehicle speed change, the latter vehicle dynamic control VDC and lane departure prevention control LDP are not intended to decelerate the vehicle but are intended to control its direction without changing the vehicle speed while the vehicle is running. Hence, it is not necessary to provide a notification to the vehicle behind or the like, and as a matter of fact, since the unnecessary turning on of the brake light confuses the driver of the vehicle behind, no notification should be provided.

Nevertheless, as described above, the brake light is turned on when the vehicle dynamic control VDC and the lane departure prevention control LDP are performed, and thus the brake light is turned on though braking for reducing the vehicle speed is not intended, with the result that this disadvantageously confuses the driver of the vehicle behind or the like.

Conventionally, in order to solve this problem, as disclosed in JP2010-264824A, a technology is proposed in which a switching switch operated in response to left and right-wheel selection brake control by the operation of the brake control device controlling the vehicle dynamic control VDC and the lane departure prevention control LDP is inserted and arranged into the electrical connection path between the power supply battery and the brake light, and in which during the vehicle dynamic control VDC and the lane departure prevention control LDP by the brake control device, the electrical connection path between the power supply battery and the brake light is opened by the switching switch. In this way, even if the brake light switch is closed by the stroke of the brake pedal described above, the brake light is not turned on.

On the other hand, when the preceding vehicle following run control ACC is performed by the brake control device, since the vehicle speed is changed for the preceding vehicle following run, even if the pressing-down stroke of the brake pedal is not generated (even if the brake light switch operated together with this is not closed), the brake light for safety is turned on with the battery at the time of deceleration of the vehicle, and thereby it is necessary to notify such deceleration to the driver of the vehicle behind.

Hence, in JP2010-264824A, a technology is also proposed in which another switch that is closed when the brake control device performs the preceding vehicle following run control ACC is provided to be connected in parallel to the switching switch described above to satisfy the above requirement.

SUMMARY OF INVENTION

Incidentally, recently, under conditions in which there is a concern about the bumping of the vehicle behind such as when braking accompanies rapid deceleration, in order to notify this to the driver of the vehicle behind, more and more brake light control devices have been made to have an ESS (emergency stoplamp system) function of blinking the brake light by switching on and off the brake light periodically.

In order to make the brake light control device of the type described above have the ESS function inexpensively without adding any component, it is preferable to periodically switch on and off the switching switch described above and thereby blink the brake light.

Incidentally, since the switching switch described above needs to be opened and closed in response to the vehicle dynamic control VDC and the lane departure prevention control LDP by the brake control device, in most cases, the switching switch is commonly formed with an electromagnetic relay switch. The electromagnetic relay switch described above is adhered to remain in an opened (OFF) state or in a closed (ON) state, and thus a failure incapable of switching between opening and closing easily occurs. At the time of the failure described above, the measure described above is useless, and it is impossible to obtain the ESS function described above.

Hence, when the switching switch is used for the measure and the ESS function described above, it is indispensable to check the opened adherence failure and the closed adherence failure of the switching switch described above.

However, as described above, when the switching switch is periodically switched on and off for the ESS function to blink the brake light, while the switching switch is being periodically switched on and off (while the brake light is being blinked), it is likely that it is impossible to check the failure of the switching switch. The reason for this will be described below.

When in the ESS function described above, the failure of the switching switch is checked, while an instruction to operate this switching switch is being output (during an ON instruction time of one period consisting of an ON instruction time and an OFF instruction time), whether or not the switching switch actually generates an operation signal, that is, whether or not an operation signal from the switching switch is present is checked, and when the operation signal is present, the switching switch is determined to be normal whereas when the operation signal is not present, the switching switch is determined to be defective. However, between the output of the operation (ON) instruction of the switching switch and the actual operating of the switching switch, a delay time is present. Hence, a failure check available time capable of checking whether or not the operation signal from the switching switch is present is a time from an instant when the switching switch is actually operated after the delay time described above to an operation (ON) instruction disappearing instant when the output of the operation (ON) instruction of the switching switch is stopped, and is shorter than a time during which the switching switch is actually operated in response to the operation (ON) instruction.

Here, although as the operation (ON) instruction time of the switching switch is increased, the failure check available time can be increased accordingly, when the operation (ON) instruction time is increased, the non-operation (OFF) instruction time of the switching switch is increased by the same amount, with the result that one period (period during which the brake light is blinked), consisting of the ON instruction time and the OFF instruction time, is significantly increased.

However, for example, at the time of rapid braking when there is a concern about the bumping of the vehicle behind, a brake light blinking period required when this fact is notified to the driver of the vehicle behind is extremely short. One period (the brake light blinking period) consisting of the ON instruction time and the OFF instruction time of the switching switch is determined so as to satisfy this requirement, and thus the failure check available time described above is insufficient. When the failure check available time is insufficient, there is a possibility that though the switching switch is actually defective, it is erroneously determined to be normal whereas though the switching switch is actually not defective, it is erroneously determined to be defective, with the result that an adverse effect is significant as compared with a case where the failure check is not performed. Hence, while the brake light is being blinked by periodically switching on and off the switching switch, the failure check on the switching switch is inevitably prohibited. This is the reason why while the switching switch is being periodically switched on and off (while the brake light is being blinked), it is impossible to check the failure of the switching switch.

An object of the present invention is to propose a brake light control device in which in the brake light control device as described above, it is possible to blink the brake light without depending on the periodical switching on and off of the switching switch and which is improved such that it is possible to check the failure of the switching switch while the brake light is being blinked.

According to one embodiment, there is provided a brake light control device that generates a braking force according to a brake operator operated by a driver, and is used with a brake device which can control the braking force according to a signal from a brake control unit regardless of the operation of the brake operator, the brake light control device including: a brake light switch that is inserted and arranged into an electrical connection path between a power supply and a brake light, and is opened and closed together with the operation of the brake operator; and a switching switch that is opened and closed in response to braking force control by the brake control unit. The brake light control device further includes: a blinking switch that is connected in parallel to the switching switch; and a brake light blinking control unit that, when the brake light is required to be blinked, is configured to keep the switching switch in an OFF state, and blinks the brake light by repeatedly switching on and off the blinking switch.

The embodiments of the present invention and the advantages of the present invention will be described in detail below with reference to accompanying drawings.

BRIEF DESCRIPTION OF DRAWINGS

FIG. 8 is a logic illustrative diagram schematically showing the failure check of the switching switch in FIG. 7 as a list;

FIG. 11 is a logic illustrative diagram schematically showing the failure check of the switching switch as a list when the brake light control device of the third embodiment shown in FIG. 10 is used.

DESCRIPTION OF EMBODIMENTS

Embodiments of the present invention will be described in detail below with respect to embodiments shown in drawings.

First Embodiment

Figure 1:
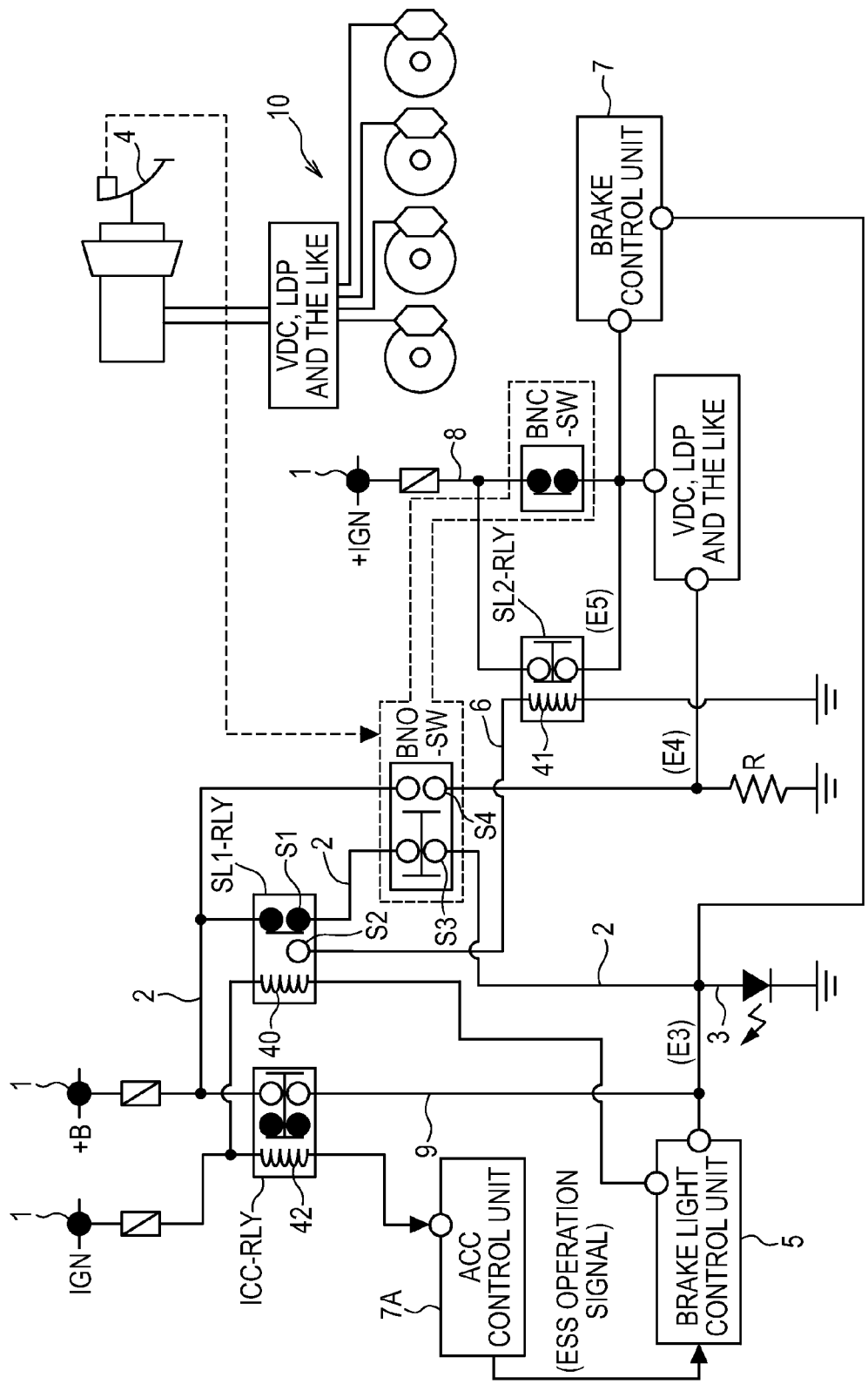
FIG. 1 is an electrical circuit diagram showing a brake light control device in a first embodiment.

FIG. 1 is an electrical circuit diagram showing a brake light control device in a first embodiment.

In FIG. 1, a power supply 1 such as a battery is electrically connected to a brake light 3 through a first electrical connection path 2.

A first brake light switch BNO-SW is inserted halfway into the first electrical connection path 2. The first brake light switch BNO-SW forms a brake light switch in the present embodiment. The first brake light switch BNO-SW is a normal-opened type switch that is opened in a normal state, and is operated from an opened state to a closed state together with an operation of pressing down a brake pedal (brake operator) 4 by a driver at the time of braking. More specifically, when the amount of stroke of the brake pedal 4 reaches a predetermined stroke indicating the start of the braking, the first brake light switch BNO-SW is operated from an opened state to a closed state together with the stroke described above, and switches the first electrical connection path 2 from an opened state to a closed state.

Incidentally, the first brake light switch BNO-SW has two contact points S3 and S4, and these two contact points S3 and S4 are respectively formed with two-contact point switches that perform the same opening and closing operation together with the operation of the brake pedal 4.

In the contact point S3 on one side of the first brake light switch BNO-SW, its one end is connected through a first switching switch (switching switch) SL1-RLY to the power supply 1, and the other end is inserted halfway into the first electrical connection path 2 so as to be connected to the brake light 3.

In the contact point S4 on the other side of the first brake light switch BNO-SW, its one end is connected directly to the power supply 1, and the other end is grounded and a resistor R is inserted halfway thereinto.

The first switching switch SL1-RLY inserted into part of the first electrical connection path 2 extending from the power supply 1 to the contact point S3 of the first brake light switch BNO-SW is a normal-closed type relay switch that is connected to the side of a first contact point S1 in a normal state to close the first electrical connection path 2. Hence, the first contact point S1 is connected in series with the contact point S3 of the first brake light switch BNO-SW described above.

One end of a relay coil 40 within the first switching switch SL1-RLY is connected to a brake light control unit 5, and the other end is connected via an ignition switch IGN to the power supply 1.

A drive instruction (an ON instruction of the first switching switch SL1-RLY) to the relay coil 40 is provided from the brake light control unit 5. Based on the instruction from the brake light control unit 5, the relay coil 40 is energized, and thus the first switching switch SL1-RLY is switched from a closed state in which the first electrical connection path 2 is connected to the side of the first contact point S1 to a state in which it is connected to the side of a second contact point S2. When the first switching switch SL1-RLY is switched to the state in which it is connected to the side of the second contact point S2, the first electrical connection path 2 is opened so as to be brought into a non-conduction state. Hence, the state in which the drive instruction (the switching switch ON instruction) is output to the relay coil 40 described above is a state in which an interruption instruction of the first electrical connection path 2 is provided.

The second contact point S2 of the first switching switch SL1-RLY is connected through a fourth electrical connection path 6 to one end of a relay coil 41 of a second switching switch SL2-RLY, and the other end of the relay coil 41 is grounded.

A brake control unit 7 is connected through a second brake light switch BNC-SW to a second electrical connection path 8 connected to the power supply 1 via the ignition switch IGN. The brake control unit 7, VDC and LDP control units controlled by the brake control unit 7 and the ACC control unit described above form a brake control means.

The second brake light switch BNC-SW is a normal-closed type switch that is closed in a normal state, and normally closes the second electrical connection path 8 to bring it into an energized state. The second brake light switch BNC-SW is operated, along with the first brake light switch BNO-SW, together with the pressing-down stroke of the brake pedal 4, and when the amount of stroke of the brake pedal 4 reaches the above-described predetermined stroke, the second brake light switch BNC-SW is operated from a closed state to an opened state. Thus, the second electrical connection path 8 is switched from a closed state to an opened state (a non-energized state).

The output (the non-energized state) of the second brake light switch BNC-SW becomes a preceding vehicle following run control cancellation signal.

The second switching switch SL2-RLY is provided to be connected to the second electrical connection path 8 such that the second switching switch SL2-RLY is parallel to the second brake light switch BNC-SW. The second switching switch SL2-RLY is a normal-opened type switch that is opened in a normal state. The second switching switch SL2-RLY is switched to a closed state by energizing the relay coil 41 connected to the second contact point S2 of the first switching switch SL1-RLY, and even when the second brake light switch BNC-SW is opened, the second electrical connection path 8 is closed to enter an energized state, and thus the output of the preceding vehicle following run control cancellation signal is prevented.

The brake light 3 is also connected through a third electrical connection path 9 to the power supply 1, and a third switching switch ICC-RLY is inserted into the third electrical connection path 9.

The third switching switch ICC-RLY normally opens the third electrical connection path 9 as a normal-opened switch that is opened in a normal state, and is switched to a closed state (conduction state) by the drive instruction (energizing) to a relay coil 42 connected through the ignition switch IGN to the power supply 1.

The drive instruction (energizing) to the relay coil 42 is provided from an ACC control unit 7A within the brake control unit 7.

Figure 2:
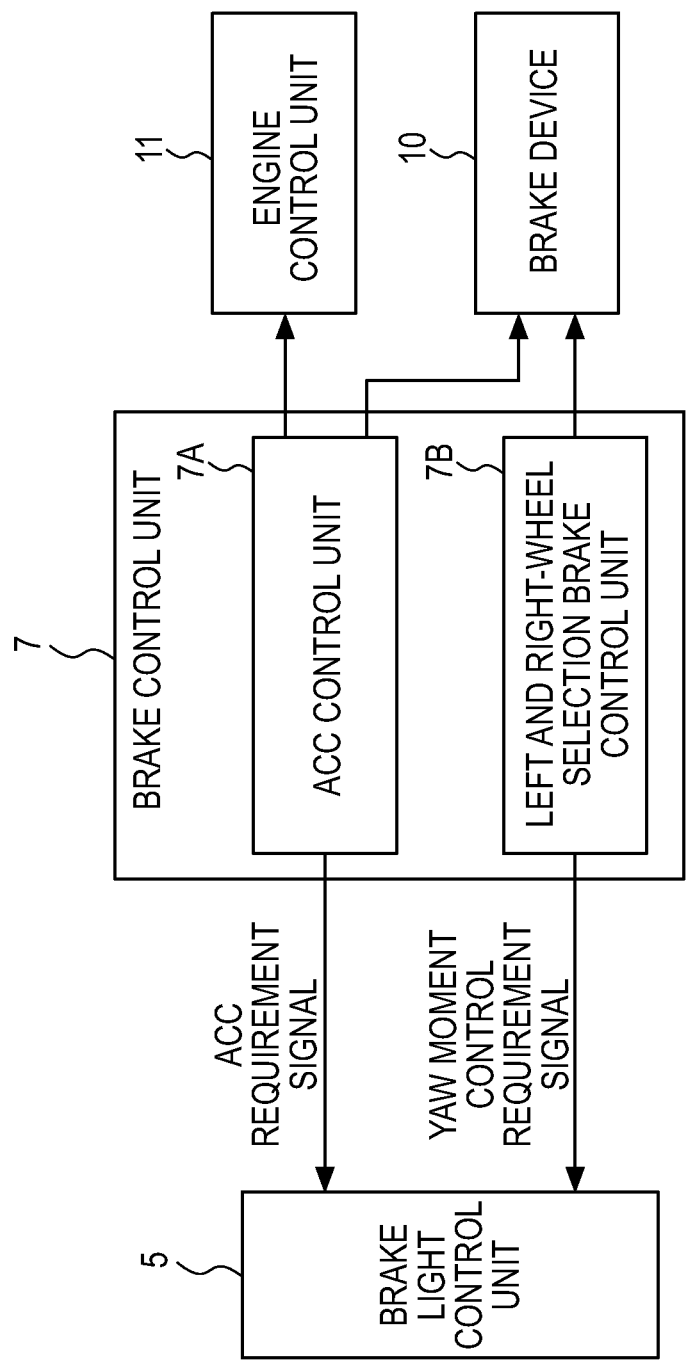
FIG. 2 is a function-by-function block diagram of a brake control unit in the electrical circuit of FIG. 1.

In the present embodiment, as shown in FIG. 2, the brake control unit 7 includes the ACC control unit 7A and a left and right-wheel selection brake control unit 7B.

The ACC control unit 7A is a control unit that performs the preceding vehicle following run control, and when a preceding vehicle is not present within a vehicle-to-vehicle time that is set, brake/drive force control on the vehicle is performed through a brake device 10 (also see FIG. 1) and an engine control unit 11 such that the vehicle speed reaches a vehicle speed that is set. On the other hand, when a preceding vehicle is present within the vehicle-to-vehicle time that is set, the brake/drive force control on the vehicle is performed through the brake device 10 and the engine control unit 11 such that the vehicle-to-vehicle time is the vehicle-to-vehicle time that is set for the preceding vehicle.

The left and right-wheel selection brake control unit 7B performs the left and right-wheel selection brake control that is intended not for the deceleration of the vehicle (so as not to produce a vehicle speed change) but for dynamic modification of the vehicle. For example, in order to provide a predetermined yaw moment to the vehicle for the vehicle dynamic control VDC, the lane departure prevention control LDP and the like, the left and right-wheel selection brake control is performed by the brake device 10 (also see FIG. 1).

In the brake device 10, master cylinder fluid pressures generated by a brake booster and a master cylinder according to the operation (pressing-down stroke) of the brake pedal 4 are individually adjusted by the brake fluid pressure circuit of each wheel into the brake fluid pressures, and these brake fluid pressures are supplied to wheel cylinders to perform a predetermined brake action.

When the brake control unit 7 performs the preceding vehicle following run control and the left and right-wheel selection brake control described above, the brake control unit 7 operates the brake booster of the brake device 10 and a fluid control valve and a pump within the brake device 10 so as to control the brake fluid pressures of each wheel, and thereby produces the intended brake action of each wheel regardless of the operation of the brake pedal 4.

Incidentally, when braking is performed on each wheel by the brake control unit 7 (the ACC control unit 7A and the left and right-wheel selection brake control unit 7B), the brake pedal 4 may produce a pressing-down stroke that is not related to the operation of the driver, together with the operation of the brake booster, the fluid control valve and the pump. As described above, even when the brake pedal 4 produces a pressing-down stroke that is not related to the operation of the driver, if the brake light 3 is turned on according to this pressing-down stroke, at the time of the vehicle dynamic control VDC or the lane departure prevention control LDP that is intended not for the deceleration of the vehicle but for dynamic control on the vehicle, the brake light 3 is turned on though a decrease in the vehicle speed is not involved, with the result that this confuses the driver of the vehicle behind.

In the present embodiment, in order to solve this problem, the brake light control device is configured as shown in FIG. 1, and as shown in FIG. 2, a preceding vehicle following run control requirement (ACC requirement) signal and a yaw moment control requirement signal from the left and right-wheel selection brake control unit 7B are output to the brake light control unit 5.

Figure 3:
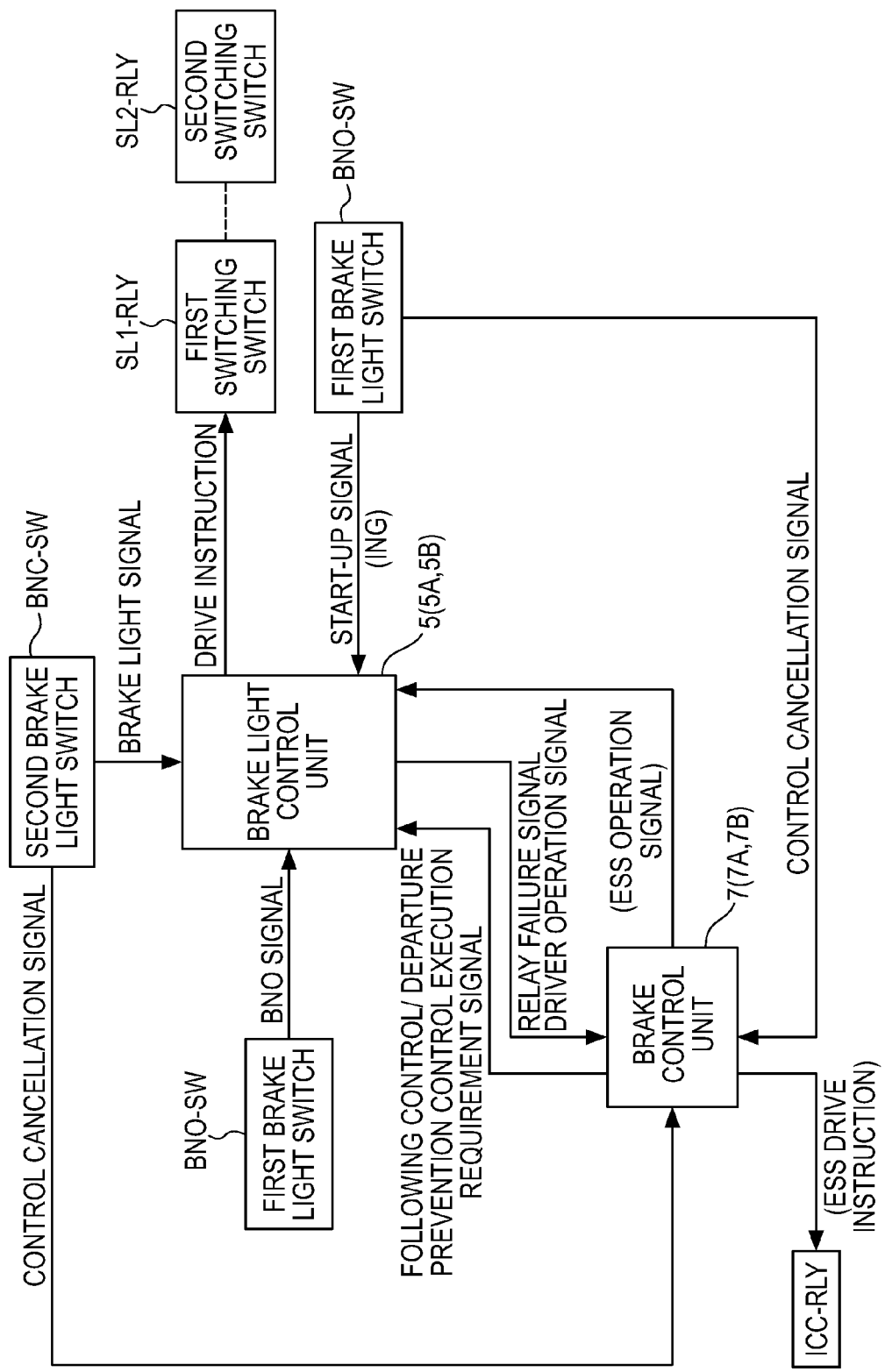
FIG. 3 is a function-by-function block diagram showing the periphery portion of the brake light control unit in the electrical circuit of FIG. 1.
Figure 4:
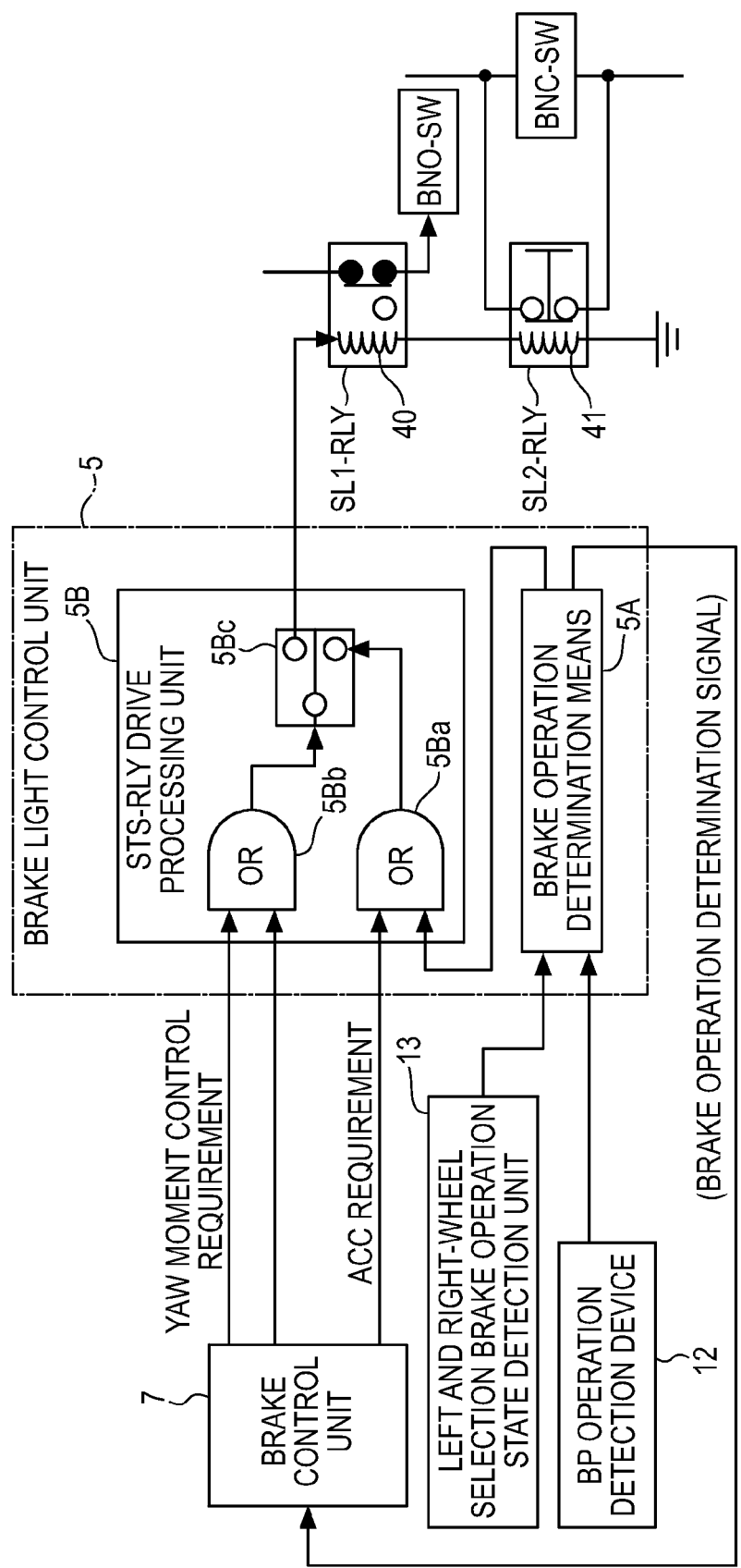
FIG. 4 is an electrical circuit diagram showing, in further detail, the periphery portion of the brake light control unit in the electrical circuit of FIG. 1.

FIGS. 3 and 4 show block diagrams of a control system around the brake light control unit 5.

The brake light control unit 5 includes, as shown in FIG. 4, a brake operation determination means 5A and an STS-RLY drive processing unit 5B.

A BP operation detection device 12 connected to the input of the brake operation determination means 5A detects the operation of the brake pedal 4. More specifically, the BP operation detection device 12 directly detects the stroke itself of the brake pedal 4 and the master cylinder fluid pressure, and thereby detects the operation of the brake pedal 4. The operation of the brake pedal 4 detected by the BP operation detection device 12 is output to the brake operation determination means 5A of the brake light control unit 5.

A left and right-wheel selection brake operation state detection unit 13 connected to the other input of the brake operation determination means 5A detects whether or not the left and right-wheel selection brake control operation by the left and right-wheel selection brake control unit 7B is present, and outputs the detected left and right-wheel selection brake control operation signal to the brake operation determination means 5A. For example, when it is detected that the operation signal for the left and right-wheel selection brake is output from the left and right-wheel selection brake control unit 7B to the brake device 10, it is determined that the operation of the left and right-wheel selection brake control by the left and right-wheel selection brake control unit 7B is present.

The brake operation determination means 5A detects, based on the left and right-wheel selection brake control operation signal from the left and right-wheel selection brake operation state detection unit 13 and an operation detection signal from the BP operation detection device 12, whether or not the operation of the brake pedal 4 by the driver is present.

Figure 5:
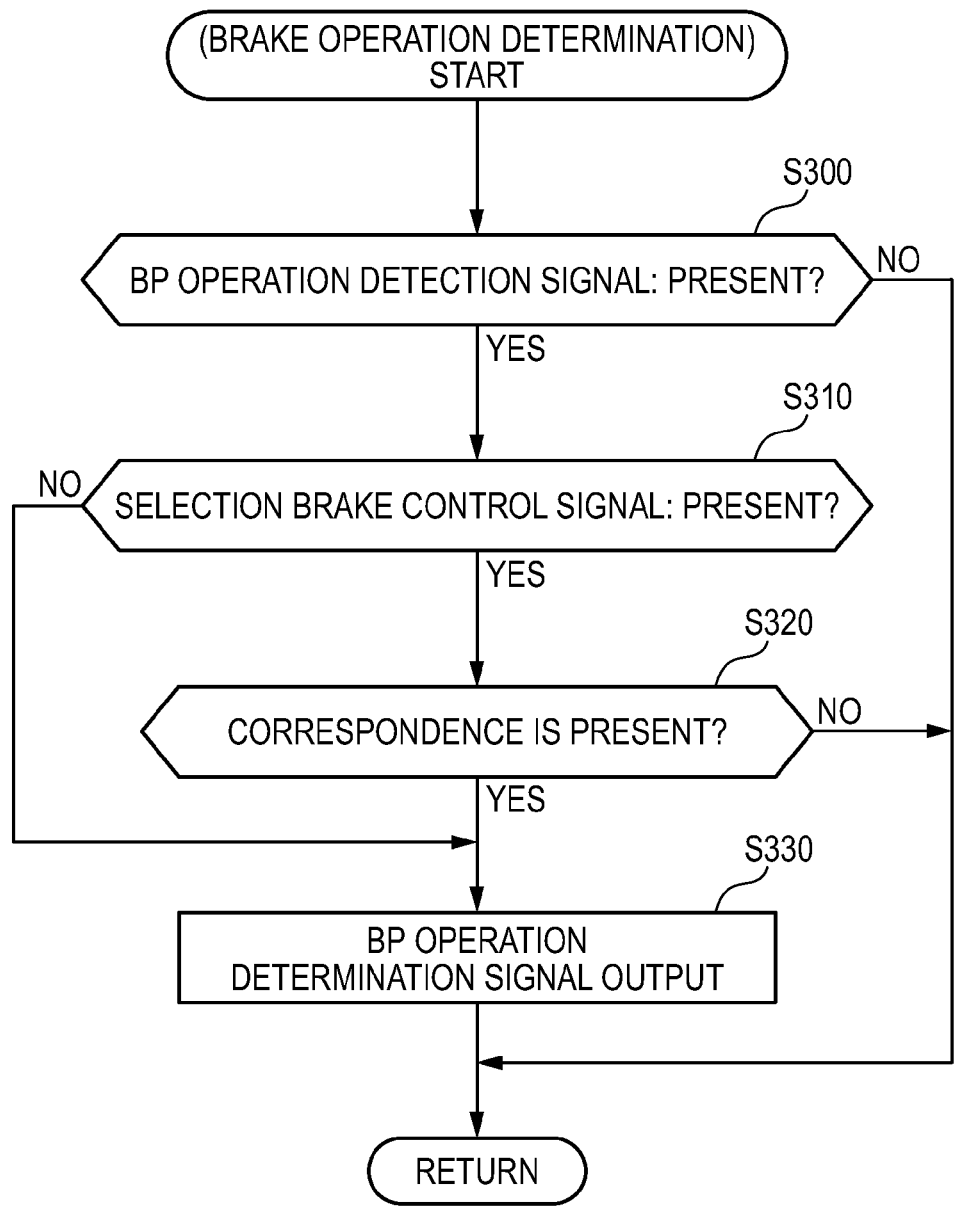
FIG. 5 is a flowchart of a control program on brake operation determination processing performed by a brake operation determination means in FIG. 4.

FIG. 5 is a flowchart showing a processing example of the brake operation determination means 5A.

If the BP operation detection signal from the BP operation detection device 12 is present and the left and right-wheel selection brake control operation signal from the operation state detection portion 13 is not present (steps S300 and S310), the brake operation determination means 5A determines that the operation of the brake pedal 4 by the driver is present, and outputs a BP operation determination signal (step S330).

If the BP operation detection signal from the BP operation detection device 12 is present and the left and right-wheel selection brake control operation signal from the operation state detection portion 13 is present (steps S300, S310 and S320), according to whether or not there is a correlation between the BP operation detection signal and the left and right-wheel selection brake control operation signal, the brake operation determination means 5A determines whether or not the operation of the brake pedal 4 by the driver is present. Specifically, if the correlation between the BP operation detection signal and the left and right-wheel selection brake control operation signal is a predetermined degree or more, it is determined that the operation of the brake pedal 4 by the driver is present, and the BP operation determination signal is output (step S330) whereas if the correlation between the BP operation detection signal and the left and right-wheel selection brake control operation signal is less than the predetermined degree, it is determined that the operation of the brake pedal 4 by the driver is not present, and the operation determination signal is not output.

Processing by the STS-RLY drive processing unit 5B in FIG. 4 will now be described.

The STS-RLY drive processing unit 5B includes, as shown in FIG. 4, an actual brake requirement determination unit 5Ba, a moment brake determination unit 5Bb and a signal output processing unit 5Bc.

When the operation determination signal from the brake operation determination means 5A described above is input to or the ACC requirement signal from the brake control unit 7 is input to the actual brake requirement determination unit 5Ba, the actual brake requirement determination unit 5Ba outputs an actual brake signal to the signal output processing unit 5Bc. As described above, the ACC requirement signal is output when the brake control for following control is performed by the ACC control unit 7A.

When the yaw moment control requirement signal is input from the left and right-wheel selection brake control unit 7B to the moment brake determination unit 5Bb, the moment brake determination unit 5Bb outputs a relay drive signal to the signal output processing unit 5Bc. As described above, the yaw moment control requirement signal is output when the left and right-wheel selection brake control is performed by the left and right-wheel selection brake control unit 7B.

When the relay drive signal is input from the yaw moment brake determination unit 5Bb, the signal output processing unit 5Bc uses the relay drive signal as the drive instruction to output it to the relay coil 40 of the first switching switch SL1-RLY. However, when the actual brake signal is input from the actual brake requirement determination unit 5Ba, even if the relay drive signal described above is input, the signal output is stopped. The relay drive signal is output only when the brake control is performed by the left and right-wheel selection brake control.

<Action of the First Embodiment>

[In a Case where the Brake Control Unit 7 is not Operated]

When the driver presses down the brake pedal 4, the first brake light switch BNO-SW is operated, and thus the first brake light switch BNO-SW is turned on. In this way, the first electrical connection path 2 is closed, the brake light 3 is brought into an energized state with respect to the power supply 1 and the brake light 3 is turned on, with the result that it is possible to notify the driver of the vehicle behind of the deceleration of the vehicle. Together with the "on" operation of the first brake light switch BNO-SW, the second brake light switch BNC-SW is also operated, and thus the second brake light switch BNC-SW is turned off.

Here, information on the operation of the brake pedal 4 (switch-on output) is input from the first brake light switch BNO-SW to the brake control unit 7, and information on the preceding vehicle following run control cancellation (switch-off output) is input from the second brake light switch BNC-SW to the brake control unit 7. By these inputs, at least the brake control for the preceding vehicle following run control by the ACC control unit 7A is stopped.

It is possible to enhance the reliability of the signal by the redundancy of the brake pedal operation information (switch-on output) from the first brake light switch BNO-SW and the preceding vehicle following run control cancellation information (switch-off output) from the second brake light switch BNC-SW.

[In a Case where the Brake Control Unit 7 is Operated with the Intention of Deceleration Such as the Preceding Vehicle Following Run Control]

In this case, the ACC control unit 7A supplies a drive current to the relay coil 42 of the third switching switch ICC-RLY to turn on the third switching switch ICC-RLY. Thus, the third electrical connection path 9 is closed. Since the third electrical connection path 9 is connected in parallel to the first electrical connection path 2, the brake light 3 can be turned on and notify the driver of the vehicle behind of the deceleration of the vehicle regardless of the state of the first brake light switch BNO-SW, that is, regardless of whether or not the brake pedal 4 is operated.

As shown in FIG. 1, the third electrical connection path 9 is also connected to the brake light control unit 5, and the brake light control unit 5 can monitor the turning on of the brake light 3 by the third switching switch ICC-RLY described above.

[In a Case where the Brake Control Unit 7 Performs the Left and Right-Wheel Selection Brake Control (Such as the VDC or the LDP]

When all three conditions (1) to (3) below are satisfied, an STS-RLY switch within the brake light control unit 5 supplies a drive current to the relay coil 40 of the first switching switch SL1-RLY.

(1) The operation of the brake pedal 4 is not performed by the driver.

(2) The brake control intended for the deceleration of the vehicle, such as the preceding vehicle following run control, is not performed.

(3) The left and right-wheel selection brake control such as for the vehicle dynamic control (VDC) and the lane departure prevention control (LDP).

When the drive current is supplied to the relay coil 40 of the first switching switch SL1-RLY, the first switching switch SL1-RLY is switched from the side of the first contact point S1 to the side of the second contact point S2, with the result that the energization of the brake light 3 through the first electrical connection path 2 is interrupted.

Hence, even when the first brake light switch BNO-SW is switched to the connected state according to the brake control by the brake control unit 7 without the brake pedal 4 being operated by the driver, it is possible to prevent the brake light 3 from being turned on.

However, when the ACC control unit 7A within the brake control unit 7 performs the brake control intended for the deceleration such as the preceding vehicle following run control, the third switching switch ICC-RLY is turned on as described above to turn on the brake light 3, and thus it is possible to notify the driver of the car behind of the deceleration of the vehicle.

Even when as a result of this, for example, the brake booster is operated for the left and right-wheel selection brake control, the brake pedal 4 is operated (subjected to stroke) together with the brake booster and thus the first brake light switch BNO-SW is turned on, it is possible to prevent the brake light 3 from being disadvantageously turned on even when the vehicle is not decelerated.

As described above, when the first switching switch SL1-RLY is switched from the side of the first contact point S1 to the side of the second contact point S2, the relay coil 41 of the second switching switch SL2-RLY is brought into an energized state, and thus the second switching switch SL2-RLY is turned on. Thus, it is possible to prevent the preceding vehicle following run control cancellation signal (the off signal of the BNC-SW) from being output to the brake control unit 7 regardless of the operated state (the stroke of the brake pedal 4) of the second brake light switch BNC-SW.

In a case where this type of function is not obtained, when the brake pedal 4 is subjected to the stroke together with the preceding vehicle following run control by the brake control unit 7 (the ACC control unit 7A) without the brake pedal 4 being operated by the driver, and the second brake light switch BNC-SW is turned off accordingly, the preceding vehicle following run control cancellation signal (the off signal of the BNC-SW) is transmitted from the second brake light switch BNC-SW to the brake control unit 7. In this way, the preceding vehicle following run control by the brake control unit 7 (the ACC control unit 7A) is stopped, and thus it is impossible to perform the preceding vehicle following run control.

However, in the present embodiment, as described above, since the second switching switch SL2-RLY is turned on by the energization of the relay coil 41 regardless of the operated state (the stroke of the brake pedal 4) of the second brake light switch BNC-SW, the preceding vehicle following run control cancellation signal (the off signal of the BNC-SW) is prevented from being transmitted to the brake control unit 7, with the result that it is possible for the brake control unit 7 (the ACC control unit 7A) to continuously perform the preceding vehicle following run control.

<ESS Blinking Control by the Brake Light>

Under conditions in which there is a concern about the bumping of the vehicle behind such as when braking accompanies rapid deceleration, in order to notify this to the driver of the vehicle behind, in terms of safety, it is preferable to blink the brake light 3 by periodically switching on and off it. In the present embodiment, such an ESS (emergency stoplamp system) function is obtained as follows.

Whether or not it is time for rapid deceleration requiring the ESS (brake light blinking) function is checked by the brake control unit 7 (the ACC control unit 7A) in FIGS. 1 and 3 using the brake pedal operation detection signal and the ACC requirement signal. When the brake control unit 7 (the ACC control unit 7A) determines that it is time for rapid deceleration requiring the ESS (brake light blinking) function, as shown in FIGS. 1 and 3, the brake control unit 7 supplies the ESS operation signal to the brake light control unit 5, and thereby instructs the brake light control unit 5 to energize the relay coil 40 to bring the first switching switch SL1-RLY into an off state where the first switching switch SL1-RLY is connected to the side of the second contact point S2. Thus, since the first electrical connection path 2 is kept opened, the brake light 3 is prevented from being turned on.

Here, furthermore, as shown in FIG. 3, the brake control unit 7 (the ACC control unit 7A) provides an ESS drive instruction to the third switching switch ICC-RLY to periodically repeat the energization and non-energization of the relay coil 42 to open and close the third switching switch ICC-RLY. By opening and closing the third switching switch ICC-RLY to periodically turn on and off the third electrical connection path 9 and to blink the brake light 3 at the same intervals, it is possible to notify the driver of the vehicle behind that rapid deceleration is necessary.

<Failure Check on the Switching Switches SL1-RLY and SL2-RLY>

Incidentally, even in the present embodiment, since the first switching switch SL1-RLY and the second switching switch SL2-RLY need to be opened and closed in response to the vehicle dynamic control VDC and the lane departure prevention control LDP by the brake control unit 7 (the left and right-wheel selection brake control unit 7B), they are commonly formed with electromagnetic relay switches. However, the electromagnetic relay-type switching switches SL1-RLY and SL2-RLY are adhered to remain in an opened (OFF) state or in a closed (ON) state, and thus a failure incapable of switching between opening and closing easily occurs. At the time of the failure described above, it is impossible to obtain the predetermined action described above. Hence, it is indispensable to check the opened adherence failure and the closed adherence failure of the switching switches SL1-RLY and SL2-RLY.

However, unlike the present embodiment, when in order to obtain the ESS function, the first switching switch SL1-RLY is periodically switched on and off to blink the brake light 3, while the first switching switch SL1-RLY is being periodically switched on and off (while the brake light 3 is being blinked), it may be impossible to perform the failure check on the first switching switch SL1-RLY and the second switching switch SL2-RLY. The reason for this will be described below.

At the time of the failure check on the first switching switch SL1-RLY and the second switching switch SL2-RLY in the ESS function, while an operation instruction of the first switching switch SL1-RLY is being provided (during an ON instruction time of one period consisting of an ON instruction time and an OFF instruction time), whether or not the first switching switch SL1-RLY and the second switching switch SL2-RLY actually generate the operation signal is checked. Specifically, whether or not the operation signal from the first switching switch SL1-RLY and the second switching switch SL2-RLY is present is checked, and in the failure check, when the operation signal is present, it is normal whereas when the operation signal is not present, it is defective.

Figure 6:
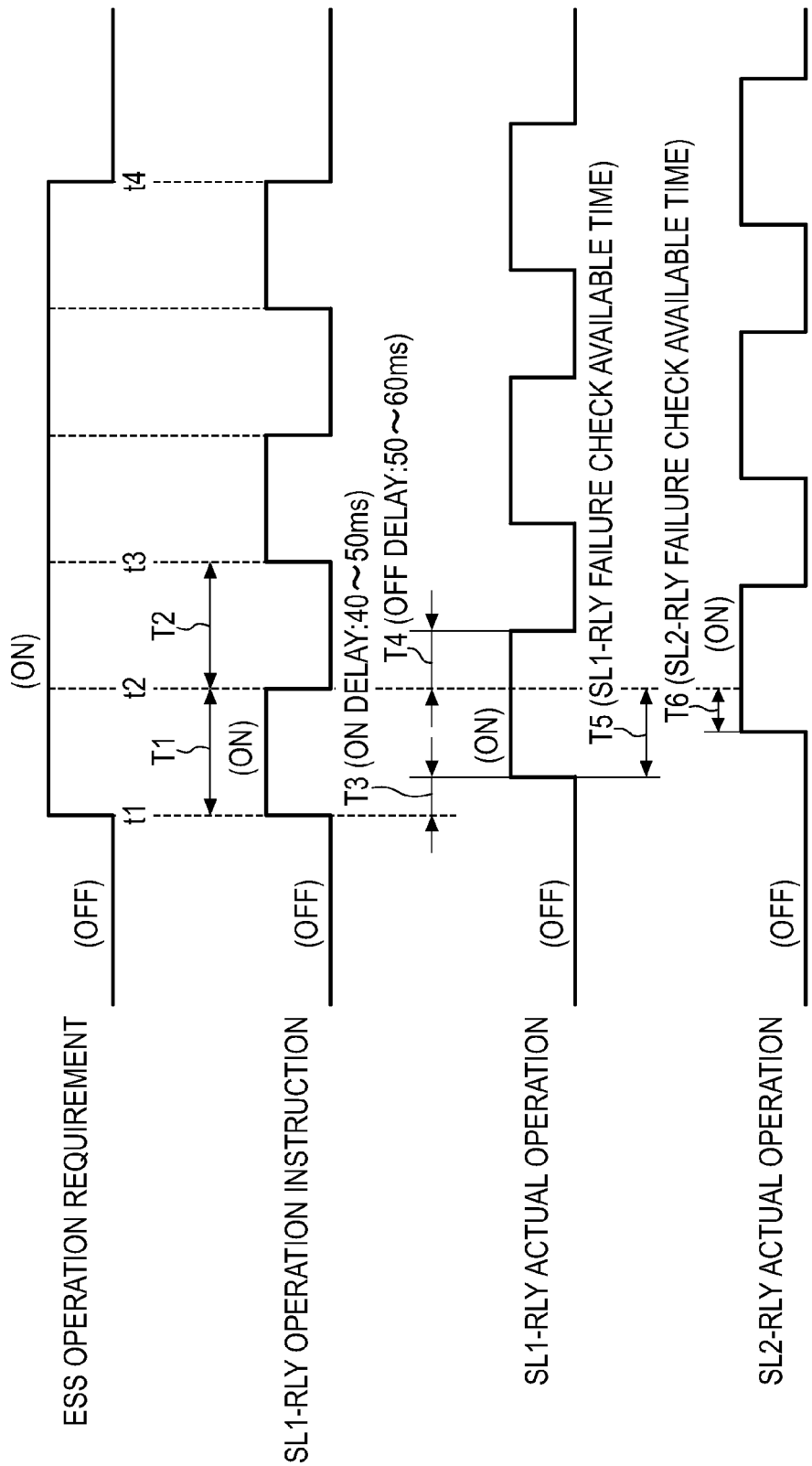
FIG. 6 is a time chart showing a failure check operation of a switching switch when a conventional brake light control device is used.

FIG. 6 is a flowchart showing a failure check operation of the switching switch when a conventional brake light control device is used. Between instants t1 to t4, an ESS operation requirement is provided, and in the meantime, the first switching switch SL1-RLY is turned on and off to blink the brake light 3.

In this case, during the ESS operation requirement period t1 to t4, the operation instruction of the first switching switch SL1-RLY is the "ON instruction" between the instant t1 and the instant t2 when a predetermined time T1 has elapsed, and is the "OFF instruction" between the instant t2 and the instant t3 when a predetermined time T2 has elapsed. In the operation waveform of the first switching switch SL1-RLY, one period is assumed to be the total values of the ON instruction time T1 and the OFF instruction time T2, and the waveform is a rectangular waveform shown in FIG. 6.

However, the first switching switch SL1-RLY is actually turned on in response to the operation instruction of the first switching switch SL1-RLY when there is only a delay of an ON delay time T3 (normally, about 40 to 50 ms) after the "ON instruction" start instant t1, and the first switching switch SL1-RLY is actually turned off when there is only a delay of an OFF delay time T4 (normally, about 50 to 60 ms) after the "OFF instruction" start instant t2.

Since the second switching switch SL2-RLY is operated according to the first switching switch SL1-RLY, as shown in FIG. 6, ON/OFF timing further delays as compared with the first switching switch SL1-RLY. Hence, the times when the failure check on the switching switches SL1-RLY and SL2-RLY can be performed by checking whether or not the first switching switch SL1-RLY and the second switching switch SL2-RLY are actually turned on to generate the corresponding operation signals while the operation instruction of the first switching switch SL1-RLY is being output (during the ON instruction time T1) are a time T5 (the first switching switch SL1-RLY) and a time T6 (second switching switch SL2-RLY) from the instant when the switching switches SL1-RLY and SL2-RLY are actually subjected to the ON operation after the above delay time to the instant t2 when the ON instruction of the first switching switch SL1-RLY disappears, and is shorter than a time during which the switching switches SL1-RLY and SL2-RLY are actually operated in response to the ON instruction.

Here, the operation (ON) instruction time of the first switching switch SL1-RLY is increased, and thus it is possible to increase the failure check available times T5 and T6 accordingly. However, the increasing of the operation (ON) instruction time means that the non-operation (OFF) instruction time of the first switching switch SL1-RLY is increased by the same amount, and thus that one period (blinking period of the brake light 3) consisting of the ON instruction time and the OFF instruction time is significantly extended.

However, at the time of, for example, rapid braking where there is a concern about the bumping of the vehicle behind, the blinking period of the brake light 3 required when notification is provided to the driver of the vehicle behind is extremely short. Hence, when the one period (the blinking period of the brake light 3) consisting of the ON instruction time and the OFF instruction time of the first switching switch SL1-RLY is determined so as to satisfy the blinking period of the brake light 3 at the time of, for example, rapid braking, the failure check available times T5 and T6 described above are insufficient. When the failure check available times T5 and T6 are insufficient, there is a possibility that though the switching switches SL1-RLY and SL2-RLY are actually defective, they are erroneously determined to be normal whereas though the switching switches SL1-RLY and SL2-RLY are actually not defective, they are erroneously determined to be defective. Since in this case, an adverse effect is produced significantly as compared with a case where the failure check is not performed, while the brake light 3 is being blinked by periodically switching on and off the first switching switch SL1-RLY, the failure check on the switching switches SL1-RLY and SL2-RLY is inevitably prohibited. This is the reason why while the brake light 3 is being blinked by periodically switching on and off the first switching switch SL1-RLY, it is impossible to check the failure on the switching switches SL1-RLY and SL2-RLY.

However, in the present embodiment, instead of blinking the brake light 3 by periodically switching on and off the first switching switch SL1-RLY, the first switching switch SL1-RLY is brought, by the energization of the relay coil 40, into the opened (OFF) state where the first switching switch SL1-RLY is connected to the side of the second contact point S2 to keep the first electrical connection path 2 in the opened state and the third switching switch ICC-RLY is opened and closed by periodically repeating the energization and non-energization of the relay coil 42 (the third electrical connection path 9 is periodically turned on and off) to blink the brake light 3. Hence, it is possible to perform, even while the brake light 3 is being blinked, the failure check on the switching switches SL1-RLY and SL2-RLY as follows.

Figure 7:
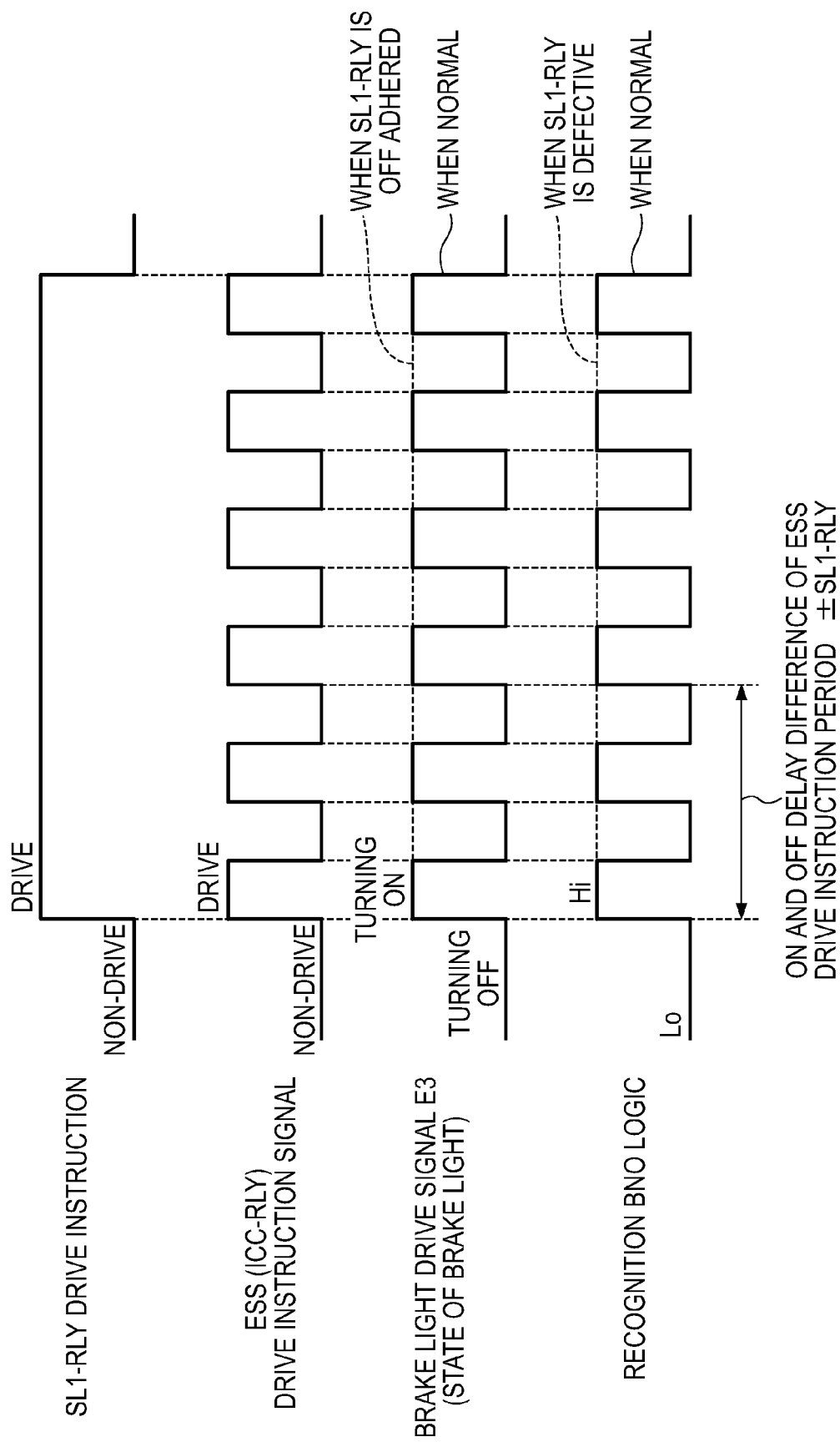
FIG. 7 is a time chart showing a failure check operation of a switching switch when the brake light control device of the first embodiment shown in FIG. 1 is used.

As described above, at the time of rapid deceleration where the ESS (brake light blinking) function is necessary, in response to the corresponding ESS requirement, as shown in FIGS. 1 and 3, the brake control unit 7 (the ACC control unit 7A) supplies the ESS operation signal to the brake light control unit 5. As shown in FIG. 7, an instruction is provided to the brake light control unit 5 to bring, by the drive of the relay coil 40, the first switching switch SL1-RLY into the state (the electrical path 2 is brought into the opened state) where the first switching switch SL1-RLY is connected to the side of the second contact point S2, and at the same time, as shown in FIG. 3, the brake control unit 7 (the ACC control unit 7A) further provides the ESS drive instruction to the third switching switch ICC-RLY in response to the ESS requirement. As shown in FIG. 7, the third switching switch ICC-RLY is opened and closed by periodically repeating the energization and non-energization of the relay coil 42.

The combination of the drive instruction (the open instruction of the electrical path 2) of the first switching switch SL1-RLY and the periodical opening and closing of the third switching switch ICC-RLY described above is as follows. Specifically, if the first switching switch SL1-RLY is normally switched to the side of the second contact point S2 in response to the drive instruction to bring the electrical path 2 into the opened state, when a brake control unit drive signal E4 is generated in FIG. 1, as indicated by the solid lines of FIG. 7, the level of a brake light drive signal E3 is changed at the same period as the opening and closing of the third switching switch ICC-RLY to blink the brake light 3.

Accordingly, as indicated by the solid lines of the figure, the level of a recognition BNO logic is changed so as to have the same waveform as the brake light drive signal E3, and by the level change of the recognition BNO logic, it is possible to determine that the first switching switch SL1-RLY is normally operated in response to the drive instruction (the open instruction of the electrical path 2) and is in the state where the first switching switch SL1-RLY is connected to the side of the second contact point S2.

Incidentally, when the first switching switch SL1-RLY cannot be normally operated regardless of the drive instruction (the open instruction of the electrical path 2), and is in the defective state where the first switching switch SL1-RLY is connected to the side of the first contact point S1, on condition that the brake control unit drive signal E4 in FIG. 1 is generated, as indicated by the broken lines of FIG. 7, the brake light drive signal E3 is kept in the same level as the power supply voltage regardless of the opening/closing period of the third switching switch ICC-RLY described above, and the brake light 3 is continuously turned on.

Accordingly, as indicated by the broken lines of the figure, the recognition BNO logic is also kept in a constant level as in the brake light drive signal E3 indicated by the broken lines. By the constant level of the recognition BNO logic, it is possible to perform the failure check to determine that the first switching switch SL1-RLY cannot be normally operated in response to the drive instruction (the open instruction of the electrical path 2), and is in the ON adherence state where the first switching switch SL1-RLY is kept connected to the side of the first contact point S1.

In the state where the check on that the first switching switch SL1-RLY is normally switched to the side of the second contact point S2 in response to the drive instruction is performed, in FIG. 1, the second switching switch SL2-RLY is supposed to output a brake control signal E5 by the energization of the relay coil 41. Hence, here, when the brake control signal E5 is not output, it is possible to perform the check to determine that the second switching switch SL2-RLY is in the OFF adherence defective state where it is impossible to switch from off to on. Then, as shown in FIG. 7, since the failure check described above can be performed in very little time whether or not the level change period of the recognition BNO falls outside a range of (the on and off delay difference of the ESS drive instruction period±SL1-RLY), even when the period is set at a short brake light blinking period necessary to notify the driver of the vehicle behind of rapid deceleration, it is possible to perform the failure check on the first switching switch SL1-RLY and the second switching switch SL2-RLY.

Since the failure check on the first switching switch SL1-RLY is performed by whether or not the level change of the recognition BNO is present, even in very little time as described above, it is possible to accurately perform the failure check on the first switching switch SL1-RLY and the second switching switch SL2-RLY.

The outline of the first switching switch SL1-RLY ON-adherence detection method in the present embodiment is shown in FIG. 8 as a list.

Second Embodiment

Figure 9:
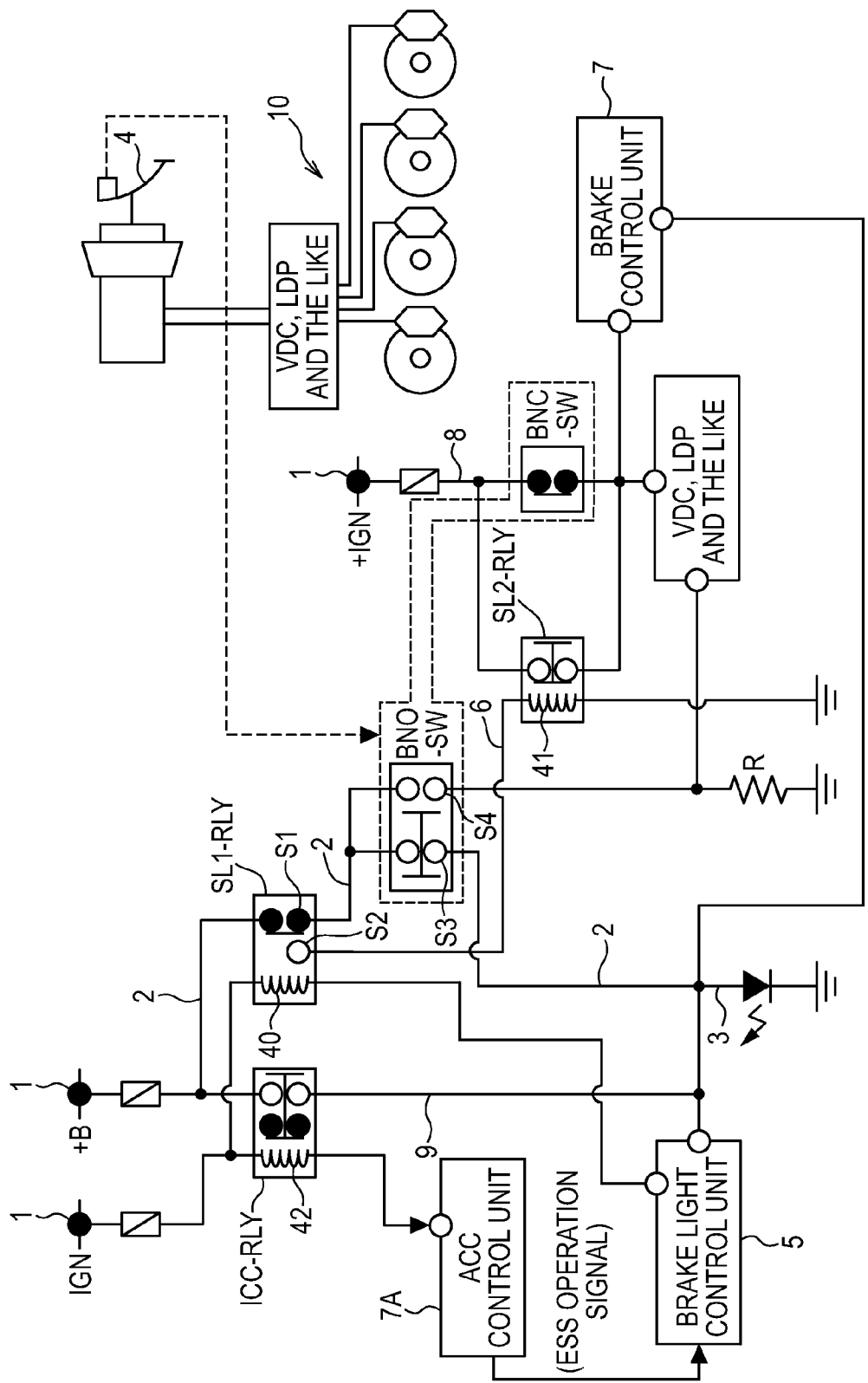
FIG. 9 is an electrical circuit diagram similar to FIG. 1, showing a brake light control device in a second embodiment.

FIG. 9 is an electrical circuit diagram showing a brake light control device in a second embodiment, and the same parts as in the electrical circuit diagram shown in FIG. 1 are identified with the same symbols, and their description will not be repeated.

In the present embodiment, the contact point S4 of the first brake light switch BNO-SW is connected to the power supply 1 through the first contact point S1 of the first switching switch SL1-RLY instead of being directly connected to the power supply 1 as shown in FIG. 1. In the present embodiment, since the other configurations are the same as in the first embodiment, actions and effects obtained are the same as in the first embodiment.

Third Embodiment

Figure 10:
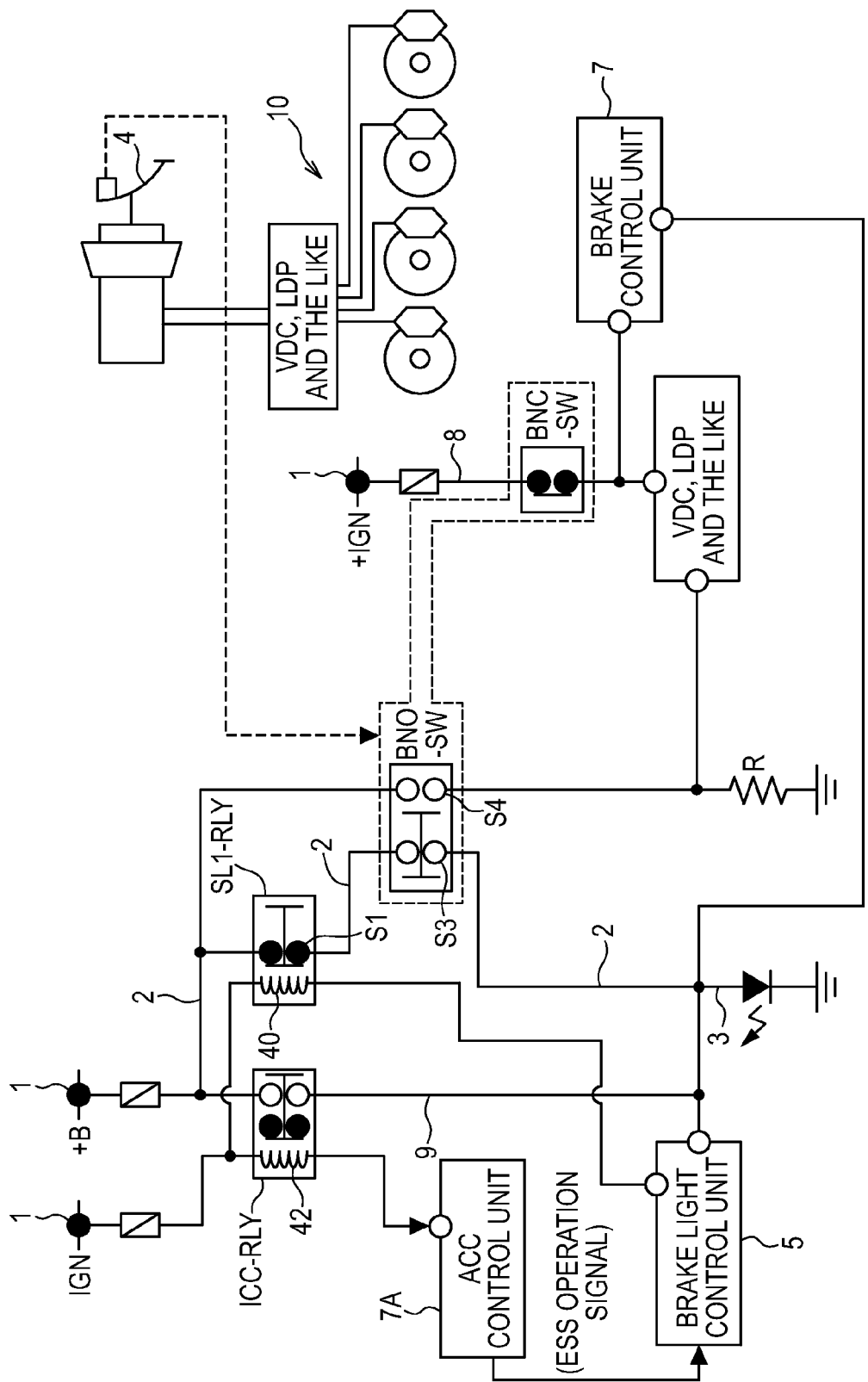
FIG. 10 is an electrical circuit diagram similar to FIG. 1, showing a brake light control device in a third embodiment.

FIG. 10 is an electrical circuit diagram showing a brake light control device in a third embodiment, and the same parts as in the electrical circuit diagram shown in FIG. 1 are identified with the same symbols, and their description will not be repeated.

In the present embodiment, the second switching switch SL2-RLY is omitted from the electrical circuit diagram of FIG. 1, the second contact point S2 of the first switching switch SL1-RLY to which this second switching switch SL2-RLY is connected is removed and the first switching switch SL1-RLY is used as a constantly closed switch in which the contact point S1 is normally closed. In the present embodiment, since the other configurations are the same as in the first embodiment, actions and effects obtained are the same as in the first embodiment except that the operations related to the second switching switch SL2-RLY are not present.

The outline of the first switching switch SL1-RLY ON-adherence detection method in the present embodiment is shown in FIG. 11 as a list.

The present application claims propriety based on Japanese Patent Application No. 2011-227764 filed with Japan patent office on Oct. 17, 2011 all of which are incorporated herein by reference.

The invention claimed is:

1. A brake light control device used with a brake device which can control a braking force according to a signal from a brake control unit regardless of an operation of a brake operator operated by a driver, the brake light control device comprising:
    a brake light switch that is inserted and arranged into an electrical connection path between a power supply and a brake light, and is opened and closed together with the operation of the brake operator;
    a switching switch that is inserted and arranged into the electrical connection path between the power supply and the brake light, the switching switch being directly connected to the brake light switch, and being opened and closed in response to braking force control by the brake control unit;
    a blinking switch that is connected in parallel to the switching switch and the brake light switch; and
    a brake light blinking control unit that, when the brake light is required to be blinked depending on an emergency stoplamp system driving instruction, is configured to keep the switching switch in an OFF state, and blink the brake light by repeatedly switching on and off the blinking switch,
    wherein the brake light blinking control unit is configured to check a failure of the switching switch when a period of a brake light drive signal to the brake light is different than a period during which the blinking switch is switched on and off by the emergency stoplamp system driving instruction.

2. The brake light control device according to claim 1, wherein the switching switch is a switch that is brought into an OFF state to prevent the brake light from being turned on during the braking force control, involving no vehicle speed change, that is performed based on the signal from the brake control unit regardless of the operation of the brake operator.

3. The brake light control device according to claim 1, wherein the blinking switch is a switch that is brought into an ON state to turn on the brake light during the braking force control, involving a vehicle speed change, that is performed based on the signal from the brake control unit regardless of the operation of the brake operator.

4. A failure checking method for checking a failure of a brake light control device used with a brake device which can control a braking force according to a signal from a brake control unit regardless of an operation of a brake operator operated by a driver,
    the brake light control device comprising:
    a brake light switch that is inserted and arranged into an electrical connection path between a power supply and a brake light, and is opened and closed together with the operation of the brake operator;
    a switching switch that is inserted and arranged into the electrical connection path between the power supply and the brake light, the switching switch being directly connected to the brake light switch, and being opened and closed in response to braking force control by the brake control unit, and
    a blinking switch that is connected in parallel to the switching switch and the brake light switch,
    the failure checking method comprising:
    keeping the switching switch in an OFF state and blinking the brake light by repeatedly switching on and off the blinking switch when the brake light is required to be blinked depending on an emergency stoplamp system driving instruction; and
    checking a failure of the switching switch when a period of a brake light drive signal to the brake light is different from a period during which the blinking switch is switched on and off by the emergency stoplamp system driving instruction.

* * * * *